United States Patent [19]
Griss

[11] 3,829,932
[45] Aug. 20, 1974

[54] APPARATUS FOR SPLITTING CARCASSES OF SLAUGHTERED ANIMALS

[75] Inventor: Giuseppe Griss, Rossruti, Switzerland

[73] Assignee: Micarna AG, Fleischwarenfabrik, Bazenheid, Switzerland

[22] Filed: Mar. 12, 1973

[21] Appl. No.: 340,164

[52] U.S. Cl. .................................. 17/23
[51] Int. Cl. ............................. A22b 5/20
[58] Field of Search ......................... 17/23

[56] References Cited
UNITED STATES PATENTS
2,634,457  4/1953  Moyer et al. ........................ 17/23
3,402,426  9/1968  Wexel ................................. 17/23

*Primary Examiner*—Robert Peshock
*Attorney, Agent, or Firm*—Flynn & Frishauf

[57] ABSTRACT

A cutter is mounted on a displaceable frame with a powered lift. A pointed guide pin affixed to sheet metal guide vanes, between which the cutter operates, is inserted into one end of the central opening of the spinal column of a carcass which is suspended by the hind legs in front of the apparatus. The cutter is then activated and the movable frame gradually moved downward to split the carcass. A cleaver blade with a diagonal offset at the portion of its edge, which enters into a slot in the guide pin, is subjected to a reciprocating movement providing a cutting stroke.

14 Claims, 7 Drawing Figures

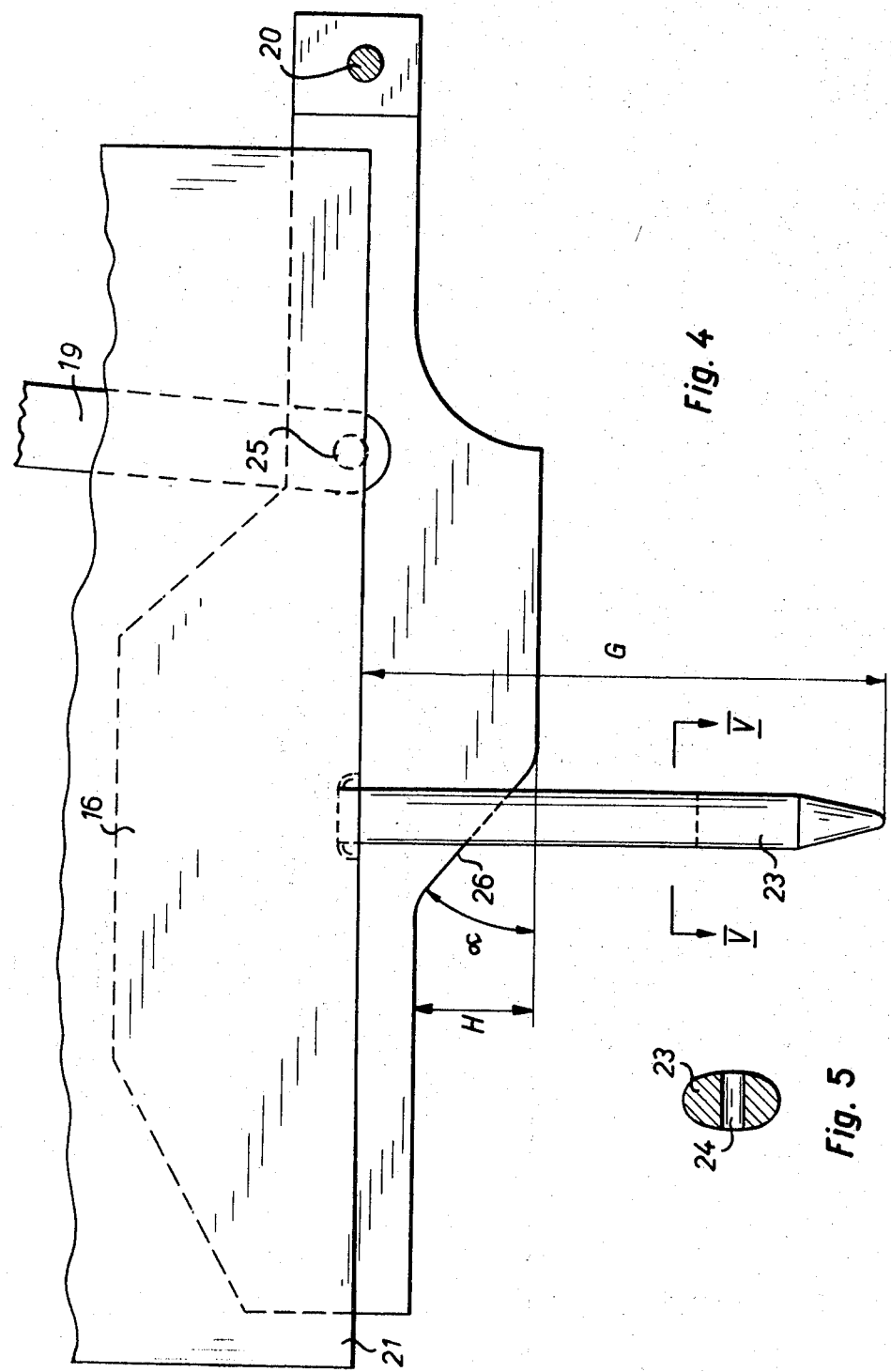

APPARATUS FOR SPLITTING CARCASSES OF SLAUGHTERED ANIMALS

This invention relates to apparatus for splitting carcasses of slaughtered animals with a power driven cleaver or saw and means for producing a vertical relative displacement between the carcass and the clever or saw.

The splitting of carcasses in the dressing of slaughtered animals generally involves the use of saws as the cutting means for beef carcasses and cleaver knives as the cutting means for smaller carcasses. This work is still largely done by hand and is physically exhausting, as well as requiring considerable manual skill to cut the spinal column of the carcass down the middle as closely as possible. Cutting the spinal column down the middle is desired in order that the separated pieces of meat as sold would have as nearly as possible the same ratio of meat to bone.

Splitting animal carcasses in half with motor driven saws is already known. There is difficulty, however, in so guiding the saw that it accurately follows the course of the spinal column in the carcass which is embedded in meat and not visible from the outside. It has also been proposed to apply a back-and-forth swinging movement to a knife subject also to a downward acting mechanical advancing movement for splitting the carcass. Here again it is difficult to follow the center of the spinal column accurately with the knife, because freshly slaughtered animal carcasses readily yield to small sideways pressure and guiding members holding the carcass on the outside are very unreliable because of the varying sizes of the carcasses.

An object of the invention is to provide a mechanical cutting apparatus capable of cutting freshly slaughtered carcasses exactly down the middle of the spinal column.

SUBJECT MATTER OF THE PRESENT INVENTION

Briefly, the cutting means is movably mounted in at least two nonvertical directions on a guiding frame along with an associated downwardly projecting pointed guiding pin that in inserted in the central cavity of the spinal column. A powered vertical movement allows the cutting means and guiding pin to be raised to the proper starting position on the adjacent carcass suspended by its hind legs to be moved downwardly relative thereto and another powered movement actuates the cutting means, at least in part in a slot in the guide pin. For pig and calf carcasses downwardly relative to both the cutting means is a knife actuated in a vertical swinging movement into and out of the said slot.

The guide pin is mounted on a sheet metal guide structure disposed on both sides of the cutting means, and this structure and the cutting means are mounted on a carrier which may be swung about the horizontal axis and/or displaced at right angles to that axis under manipulation by steering device. In this manner, it is possible to establish and maintain an exact relative position of the cutting device with respect to the carcass to be split, so that the spinal column can be divided exactly at the desired place. This mechanized cutting operation is performed relatively quickly, so that this operation is readily incorporated in conveyor line dressing of carcasses in large installations.

The invention will be described by way of example with reference to the accompanying drawings, wherein:

FIG. 4 is a detail view, in side elevation, of the cutting means and guide pin;

FIG. 5 is a cross section of the guide pin along the line V—V in FIG. 4;

The carcass splitting apparatus described in connection with FIGS. 1–7 as an illustrative embodiment of the invention, is one which is primarily designed for pig and calf carcasses and hence utilizes a cleaver knife for cutting. Either freshly slaughtered or deep frozen pigs and calves may be cut lengthwise into halves ("sides") by this mechanically operated power driven splitting apparatus. In this operation the slaughtered animals have already had their heads cut off and viscera removed from the carcass, and they are suspended by their hind legs 37 in such a way on a hanger 35 that the open belly side 36' (FIG. 6) is turned towards the apparatus.

Figure 1:
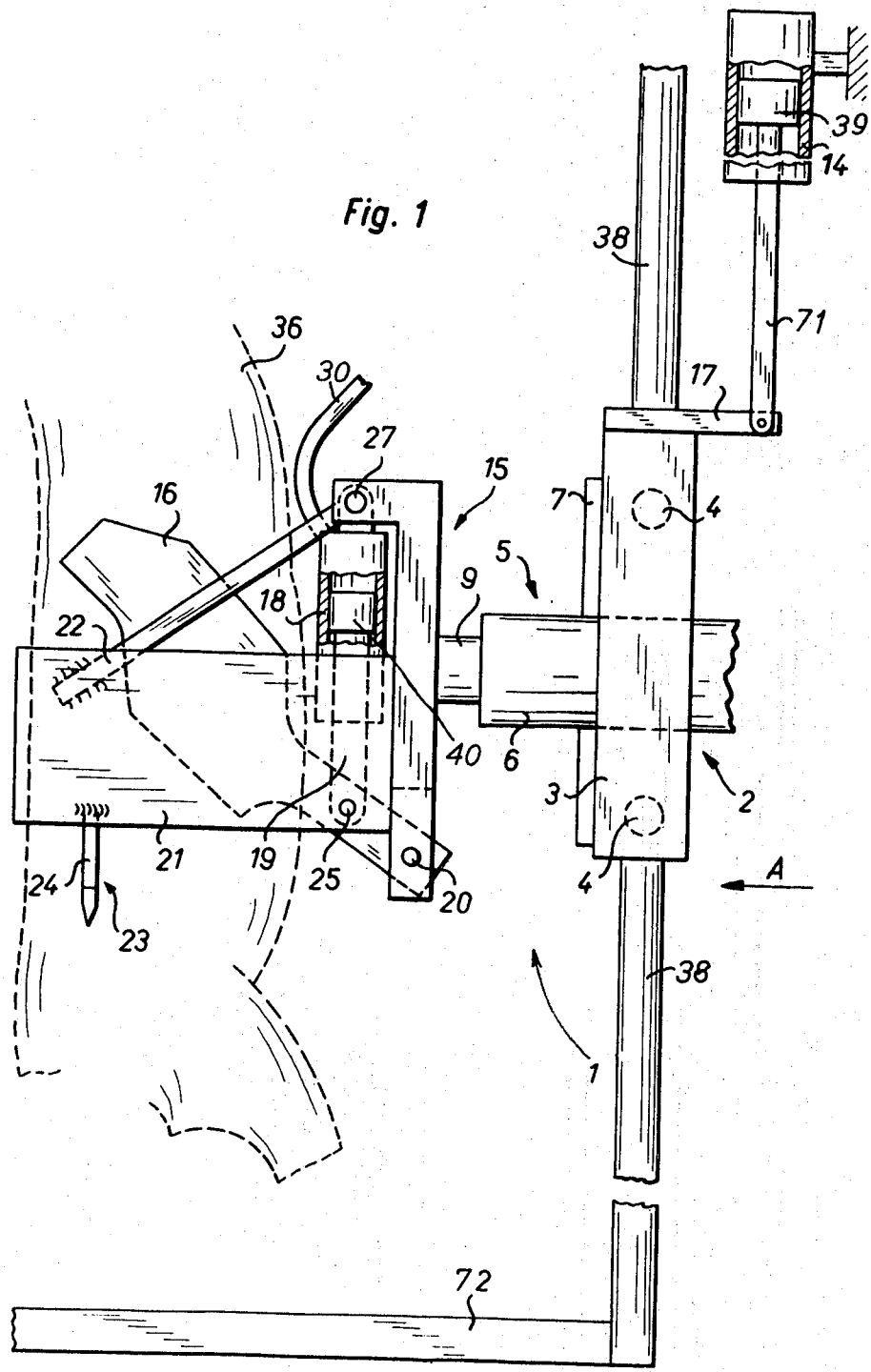
FIG. 1 is a side elevation view, partly broken away, of a carcass splitting apparatus.

The splitting apparatus contains two spaced vertical columns 38 connected together by a foot member 72 (FIG. 1). This foot member 72 may also be provided in the form of a base plate for the case of a stationary apparatus. A sliding carriage 2 is movable up and down on the vertical columns 38. It comprises two guide bushings 3, each mounted on one of the vertical columns 38, and also two spaced cross rods 4 which connect both bushings 3 rigidly together. A horizontally slidable frame 5 is slidably mounted on the cross rods 4. The slidable frame 5 has a central guide bushing 6, which is rigidly connected with the sliding bushings on which the frame 5 is mounted by means of the diagonal struts 7. The guide bushing 6 serves to carry a horizontal shaft 9, which in addition to being rotatable in the bearing thus provided, is displaceable in the axial direction (FIG. 3).

Figure 3:
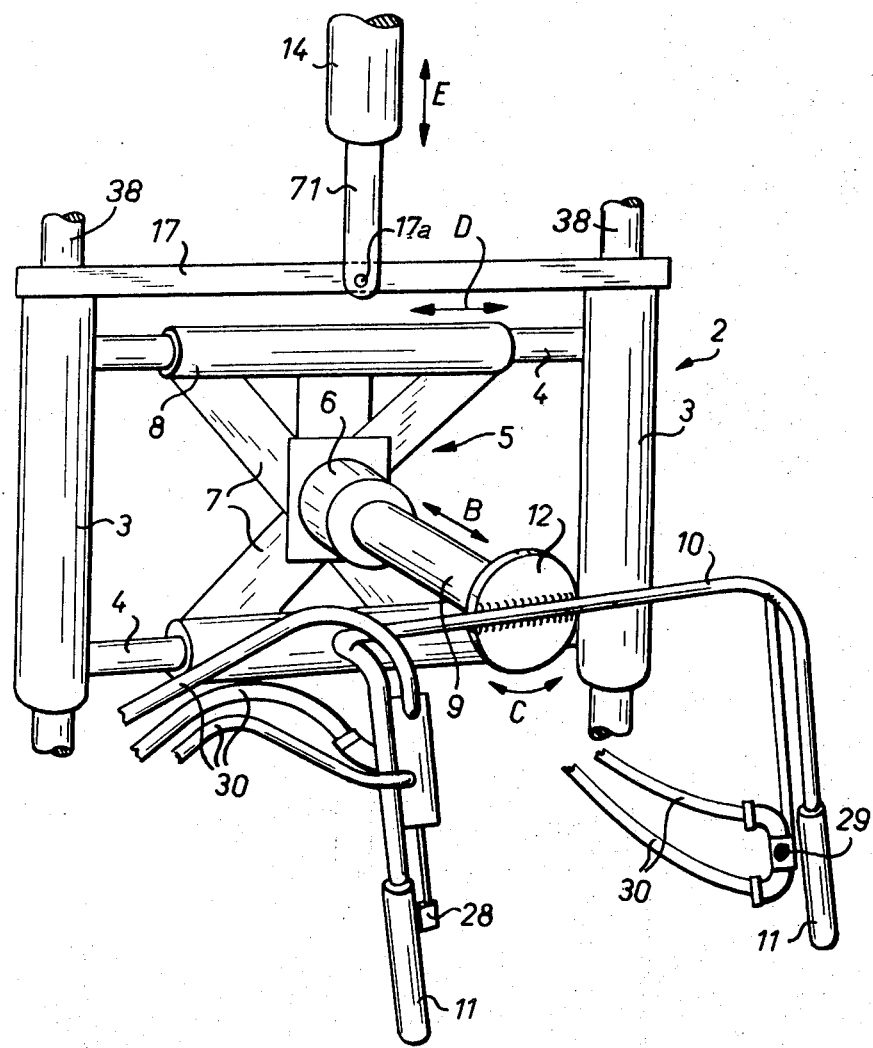
FIG. 3 is a partial perspective view from the operator's side of the apparatus more or less in the direction of the arrow A in FIG. 1.

On the end of the shaft 9 that protrudes from the guide bushing 6 on the operator's side of the apparatus is a steering device 10 in the form of a handle-bar with two hand grips, as shown in FIG. 3.

The handlebar 10 is rigidly connected to the shaft 9 by means of a flange 12, for example by welding. Thus, on the one hand, the shaft 9 can be displaced horizontally in the axial direction as shown by the double ended arrow B and, on the other hand, it can be rotated about its longitudinal axis in the direction shown by the double arrow C. In addition, the entire sliding carriage 5 can be shifted back and forth in the direction of the double arrow D, also by means of the manually operated steering device 10. Finally, the sliding carriage 2 with all the members carried by it can be moved up and down over the entire length of a carcass 36 in the direction of the double arrow E by means of one or more compressed air lift devices 14. The compressed air cylinder 14 is shown with a piston rod 71 connecting the piston 39 (FIG. 1) to a cross arm 17 fastened to the two bushings 3, at either end, and fastened to the piston rod 71 in the middle by a connecting pin 17a.

At the end of the shaft 9 on the carcass side of the apparatus is a carrier 15 for the cutting means 16, which as previously explained is in this case a cleaver knife. The carrier 15 is provided with a compressed air actuator cylinder 18 in which is seated a piston 40 provided with a piston rod 19 which is also connected to the knife 16 at a pivot stud 25 at a suitable distance from the pivot stud 20 about which the knife is caused to move. The swinging motion of the knife 16 thus provided for is adapted to apply a striking movement against the spinal column to be split. The actuating cylinder 18 is pivotally mounted on a pin 27 fixed on the carrier 15. The knife 16 is located between two sheet metal guides or vanes 21 disposed essentially in V-shape, which serves to spread apart the meat in the neighborhood of the cut. The two sheet metal members 21 are spaced apart in the region in which the cleaver knife 16 moves, so that the latter can strike through into its lower position between these two guide plates 21. Diagonal stiffening struts 22 are provided between the carrier 15 and each of the sheet metal guides 21.

A downwardly projecting guide pin 23 is rigidly fixed to the sheet meatl guides 21, for example by a welded joint. This guide pin 23 serves to penetrate into the hollow spinal column of the animal carcass and thus to guide the cleaver 16 exactly along the same, so that the spinal column may be cut exactly in the middle for its whole length. The guide pin 23, as shown in FIG. 5, is provided with a longitudinal slot 24 in which the cleaver 16 may penetrate for at least the upper half of length of the guide pin in order to reach its lowest position. This guide pin 23 has a pointed lower extremity and has a length G such as to enable it to follow the natural curvature of the spinal column of the carcass. It has been found that the length G of the guide pin 23, measured from the lower edge of the sheet metal guides 21, is suitably in the range of about 12 to 16 cm.

Figure 2:
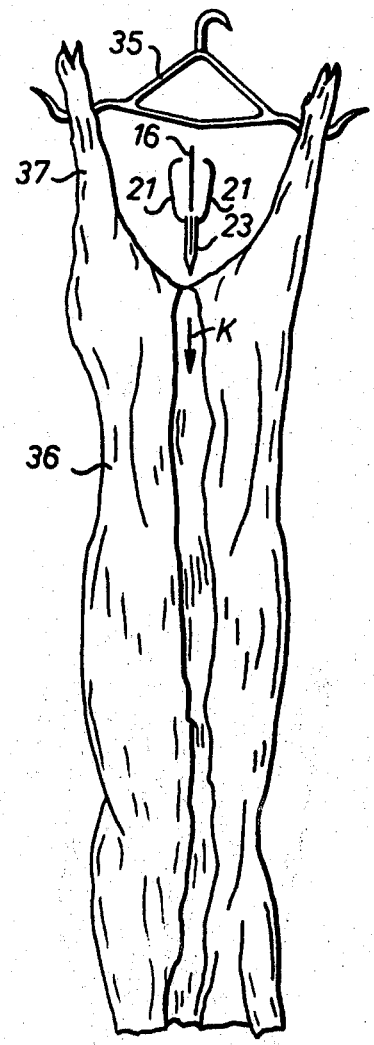
FIG. 2 is a diagrammatic view of the splitting apparatus together with a carcass to be split vertically in half.

The cutting edge of the cleaver 16 is provided with a slanting offset 26, as shown in FIGS. 2 and 4. The offset 26 is located in the region of the guide pin 23 when the cleaver 16 is in its lower position and serves to cut the ribs or fins of the vertebrae with a diagonal cut. This knife blade shape has been found particularly effective in practice. The height difference H of the offset (FIG. 4) is between approximately 50 and 80 mm and the acute angle $\alpha$ is approximately 40°.

The cross sectional shape of the guide pin 23 is not round, but rather oval to correspond with the shape of the opening in the spinal column. The slot 24 accordingly runs parallel to the smaller axis of the oval cross section, as shown in FIG. 5.

Control switches or valves 28,29 are provided at or in the neighborhood of the hand grips 11 for control of the operation. One control switch 28 serves for the height adjustment of the lifting means 14, i.e., for varying the vertical position of the sliding carriage 2. The control switch 29 is effectively connected with the knife actuator 18 and by its manipulation produces an oscillating or swinging movement of the cleaver 16. These control switches are connected with valves located in the compressed air lines 30 of the pneumatic system of the apparatus, the control switches being connected with the valves either directly or over electric actuating devices. The cylinder 18 can be equipped either with a spring return or with a double acting piston 40. In the case of double acting vertical drives, corresponding reversing switches and related compressed air lines are provided. In order to obtain a sufficiently strong impact effect for the knife stroke, it is advantageous to provide pressure storage means such as are presently known, on the inside of the cylinder 18, with the help of which a stroke can be suddenly released as soon as the necessary pressure has built up.

The manner of operation of this splitting apparatus is as follows:

A carcass 36 susupended on a hanger 35 is brought in front of the splitting machine with the belly opening 36' turned towards the splitting apparatus, as shown from the carcass side in FIG. 2. The carcasses have already at this stage had the heads and viscera removed. A short cut is made by hand between the hind legs 37 of the carcass 36 in order to bare the spinal column. The sliding carriage 2 is then raised by means of the lift 14 and then, by actuation of the handlebar 10, the guiding point 23 is brought into a position from which it can be lowered into the central cavity of the spinal column. The guide pin 23 is manipulated by means of the handlebar 10 until the correct insertion position is found. As soon as the point of the guide 23 falls into the opening in the spinal column, the bone structure provides a sure guide for the cleaver 16, which is then set into operation by actuating the switch 29. A succession of striking movements of the cleaver are then produced along the spinal column, in the course of which the bones are split exactly in the middle. By operating the switch 28, the sliding carriage 2 is at the same time lowered slowly carrying the apparatus components mounted thereon gradually downward corresponding to the progress of the splitting operation. Because the carcass 36 hangs freely on the hanger 35 and therefore no additional guides are present below, the guiding pin 23 can follow the middle of the spinal column of the carcass 36 exactly and accordingly provides precise guidance for the cleaver 16 from top to bottom, as indicated by the direction K IN FIG. 2. Whatever deviations there may be from the exact vertical position are readily corrected by slight horizontal shifting of the carriage 5 in the direction of the arrow D or by slight rotation of the shaft 9 in the direction of the arrow C. In the region of the neck of the carcass, the guide pin 23 comes out of the bone into the meat, at which time the halves of the carcass can be completely separated by one or two further strokes. The splitting apparatus here described is particularly designed for use with pig and calf carcasses.

Instead of a single cleaver 16 as above described, it is possible to use a triple knife with an outer spacing between blades of about 20 to 25 mm and in this way to cut the spinal column from the ribs and pull it out. Also in this case a guiding pin 23 is present, which in such case is located centrally with respect to the blades and in the same way serves as a guide for the exact position of the cut. This triple knife is so constructed that the blades perform equal and synchronous movement.

For another modified embodiment, instead of the rising and falling sliding carriage a fixed member may be provided and the hanger 35 on which the carcass is suspended may be raised by means of a block and tackle.

Instead of compressed air actuators 14 and 18, corresponding devices can be used which operate hydraulically or on a combined hydraulic-pneumatic principle.

Whatever the cutting means may need to be for the particular carcass on which it operates, it should operate between sheet metal guides 21 and the sheet metal guide structure should carry a pointed guiding pin. With some types of cutting means, for example saws, the movement of the cutting means vertically into and out of the guide pin is generally not necessary.

The cutting operation of the apparatus of this invention lends itself readily to automation by use of automatic control systems after the introduction of the point of the guiding pin 23 into the upper end of the spinal column of the carcass.

Figure 6:
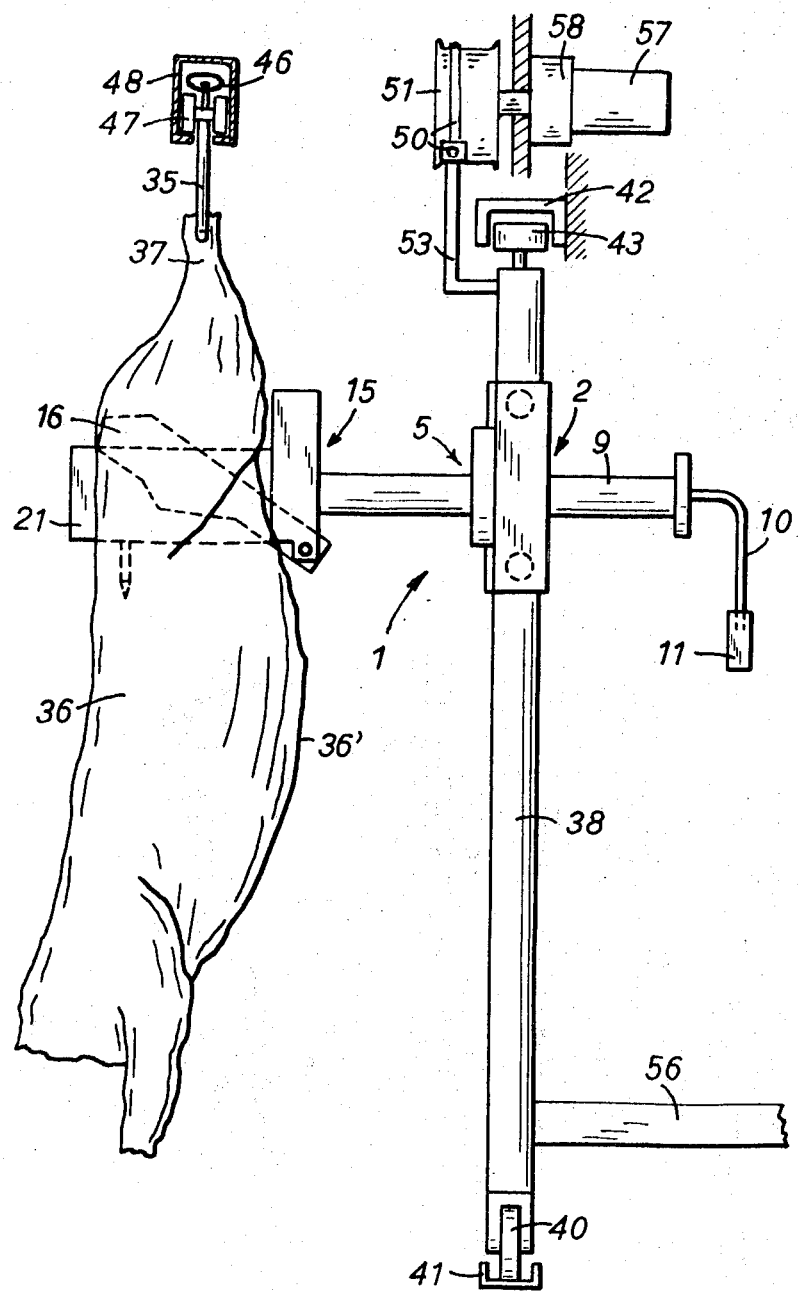
FIG. 6 is a side elevation view of a conveyor mounted splitting apparatus.

In FIG. 6 a movable form of a carcass splitting apparatus is shown diagrammatically for use in a conveyor connected sequence of carcass dressing operations. The apparatus is shown generally at 1 and is in most respects structured the same way as already explained in connection with FIGS. 1-4.

Two adjacent vertical columns 38 are guided at their lower ends in a floor rail 41 by means of wheels 40 that turn on horizontal axles. These vertical columns 38 are guided at the top by an overhead track 42 in which at least one positioning roller 43 moves, mounted on a vertical axle. The track 42 is fixed to the building. The sliding carriage 2 may be raised or lowered on the columns 38, as already explained in connection with FIGS. 1-4, for movement up and down along the length of a carcass 36.

The carcasses 36 each suspended by their hind legs 37 on a hanger 35 are here also turned with their open belly sides to the splitting apparatus. The hanger 35 is linked into a horizontal conveyor chain 46 and is provided with rollers 47, which run along an overhead track 48. The conveyor chain is moved continuously slowly forward along the track 48 and carries the carcasses 36 along. During this movement, the splitting operation takes place as already described. The continuous forward transport of the carcass 36 requires a parallel movement of equal speed for the splitting apparatus 1. The latter is accordingly advanced horizontally by means of a cable 50, for example a wire cable. The cable 50 is clamped or or otherwise made fast to a rod 53 rigidly connected to the splitting apparatus 1. The other end of the cable is wound on a cable drum 51 driven by a motor 57 through a reduction gear 58.

Although it is not specifically shown in FIG. 6, the splitting apparatus 1 here also has a powered vertical displacement means such as that shown in FIG. 1 with the components 14, 17, 39 and 71.

If the rails 41,42 and 48 run in straight lines, the splitting apparatus will repeatedly travel over a limited path synchronously along with the carcass 36 which is to be split. During each such conveyor-paced movement, the splitting operation is carried out in the manner already described. At the end of each operation, the motor 57 will be switched off and the entire splitting apparatus will be shifted back again to its initial position and as soon as the next carcass 36 is brought up to it by the conveyor chain 46, the splitting apparatus 1 can again be moved forward synchronously along with it. The return of the splitting apparatus may be effected by hand, or it may be operated by other means, such as a weight, a spring loaded drum, or another motorized drum (not shown) at the end of a rearward extension of the cable 50. In order that the operator may be carried along with the splitting apparatus, a projecting platform 56 is mounted near the bottom of the vertical columns 38 on which the operator may stand.

Figure 7:
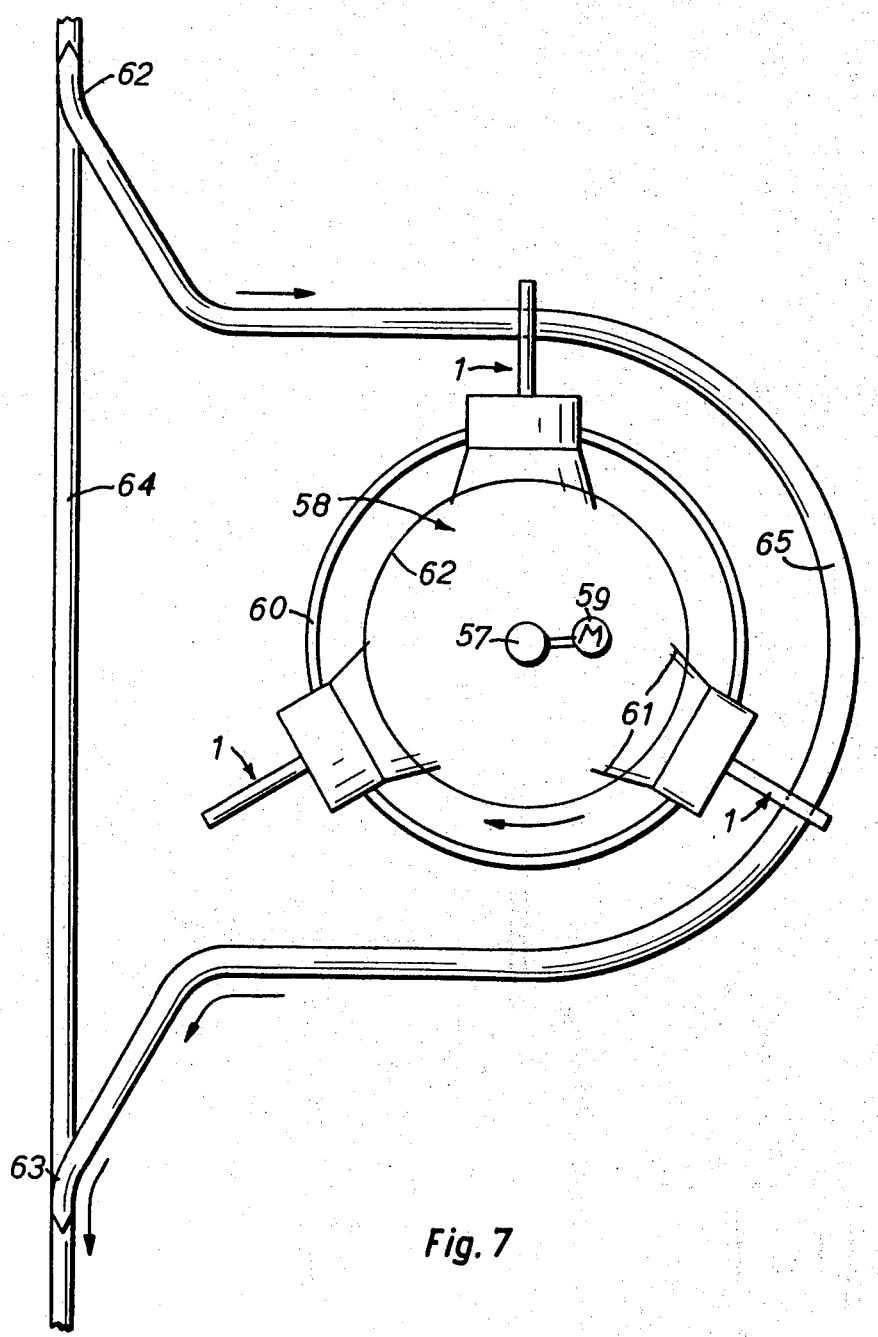

In FIG. 7 a modified embodiment is shown diagrammatically in plan view. There are three movable splitting machines 1 mounted on a turret 58 that rotates on a vertical shaft 57 and is driven by a turret drive motor 59. The turret 58 is supported below on a circular rail 60. The individual splitting machines 1 are firmly mounted on the rotating platform 62 by means of struts 61 or the like. The overhead track has a semicircular track piece 65 connected with the straight portion of track 64 by two switches 62 and 63. If now the carcasses 36 are led into the semicircular track segment 65 by suitable setting of the switches, the turret 58 revolves, carrying the three splitting machines around at the same velocity, so that the splitting operation may take place in the neighborhood of the semicircle 65 while continuous movement of the carcasses goes on.

Although the invention has been described with reference to particular embodiments, it will be understood that modifications may be made within the inventive concept without departing from the spirit of the invention.

I claim:
1. Apparatus for splitting carcasses of slaughtered animals comprising:
   a guiding frame (38);
   means (35) for suspending a carcass (36) adjacent to said guiding frame for splitting;
   a carrier (15) supported by said frame (38) and movably mounted thereon for movement including movement in at least two non-vertical directions (B,C,D);
   cutting means (16) supported on said carrier and actuatably mounted thereon;
   a downwardly projecting pointed guide pin (23) for said cutting means suitable for introduction into the central opening of the spinal column of said carcass;
   powered actuating means (18, 19, 40) for said cutting means supported on said carrier (15);
   hand-operable means (9,10) for manipulating the position of said carrier (15) and thereby said cutting means and said guide pin into and in alignment with the central opening of the spinal column of said carcass, and
   powered displacing means (14) for relative vertical movement of said carrier and said carcass.
2. Apparatus as defined in claim 1 in which said guide pin (23) is provided, at least in its upper portion, with a longitudinal slot (24) and in which said cutting means (16) is movably insertable in said slot (24)
3. Apparatus as defined in claim 1 in which said cutting means (16) are constituted of at least one knife blade pivotally mounted at one end about a normally horizontal axis (20) on said carrier (15) and in which said actuating means (18,29,40) are means for controllably swinging said cutting means with a striking motion about said pivotal mounting relative to both said guide pin and said carcass.
4. Apparatus as defined in claim 3 in which said carrier (15) is movable (C) for deviating said normally horizontal axis from the horizontal while similarly deviating said guide pin from vertical alignment.

5. Apparatus as defined in claim 3 in which said carrier (15) is movable in at least two mutually perpendicular directions and is additionally pivoted about a second horizontal axis (9).

6. Apparatus as defined in claim 3 in which said powered displacing means (14) for relative vertical movement includes a pneumatic or hydraulic means (14) for lifting and lowering said carrier.

7. Apparatus as defined in claim 2 in which said guide pin (23) is of oval cross section, has a length less than 16 cm. and is fixedly mounted on a sheet metal guide structure (21) disposed on both sides of said cutting means (16).

8. Apparatus as defined in claim 3 in which said cutting means (16) include a knife blade having an oblique edge portion (26) located in the end portion of the lower cutting edge of said knife in the region of said slot (24) of said guide pin (23) and is so disposed that the portion of said cutting edge farthest from the pivot (20) of said cutting means is upwardly offset with respect to the portion of said cutting edge closer to said pivot (20).

9. Apparatus as defined in claim 1 in which said means (35) for suspending said carcass is movable for conveying said carcass and in which the remainder of the apparatus, including said guiding frame (38), said cutting means (16) and mechanism therewith, is likewise movable, and means are provided, including overhead and floor rails, for producing synchronous movement of said suspension means and of said cutting means at least during the splitting operation.

10. Apparatus as defined in claim 9 in which said cutting means and mechanism associated therewith are turret mounted for movement in a circular path and said suspension means (35) for carcasses to be split are movable on a conveyor track in an arc of about a half circle about said turret mount.

11. Apparatus as defined in claim 1 in which said powered displacing means (14) and said powered actuating means (18,19,40) are each provided with hand-operable controls (28,29) in the immediate vicinity of said hand-operable means (9,10).

12. Apparatus for splitting carcasses of slaughtered animals comprising:
   a guiding frame (38);
   means (35) for susupending a carcass (36) adjacent to said guiding frame for splitting said carcass;
   a shaft (9) displaceably and rotatably mounted on said guiding frame for both longitudinal and transverse displacement and for rotation about a horizontal axis;
   a carrier (15) on the end of said shaft nearer said carcass;
   cutting means (16) supported on said carrier and actuatably mounted thereon;
   a downwardly projecting pointed guide pin (23) for said cutting means fixably mounted on said carrier and of a size suitable for introduction into the central opening of the spinal column of said carcass;
   powered actuating means (18,19,40) for said cutting means supported on said carrier (15);
   powered displacing means (14) for relative vertical movement of said carrier and said carcass, and
   manual steering means (10) on the opposite end of said shaft (9) from said carrier (15) for movement of said shaft pivotally about its longitudinal axis and for displacement thereof longitudinally and, at least in the horizontal plane, transversely.

13. Apparatus as defined in claim 12 in which said powered displacing means (14) for relative vertical movement of said carrier and said carcass is in the form of means for displacing said shaft (9) vertically on said guide frame (38).

14. Apparatus as defined in claim 12 in which said powered displacing means (14) and said powered actuating means (18,19,40) are each provided with hand-operable controls (28,29) mounted on said steering means (10).

* * * * *